April 5, 1966 M. L. BAKER 3,244,066

TILT LIMITING ARRANGEMENT FOR A MECHANICAL ELEMENT

Filed July 16, 1962 2 Sheets-Sheet 1

INVENTOR.
MELVIN L. BAKER
BY
Fraser and Bogucki
ATTORNEYS

TILT LIMITING ARRANGEMENT FOR A MECHANICAL ELEMENT

Filed July 16, 1962 2 Sheets-Sheet 2

INVENTOR.
MELVIN L. BAKER
BY
Fraser and Bogucki
ATTORNEYS

United States Patent Office 3,244,066
Patented Apr. 5, 1966

3,244,066
TILT LIMITING ARRANGEMENT FOR A MECHANICAL ELEMENT

Melvin L. Baker, Woodland Hills, Calif., assignor, by mesne assignments, to Bunker-Ramo Corporation, Stamford, Conn., a corporation of Delaware Filed July 16, 1962, Ser. No. 209,856
13 Claims. (Cl. 88—24)

This invention relates to electromechanical positioning devices, and more particularly to an arrangement for variably limiting the degree of rotation of an element in accordance with its existing position.

In the stereomapping system which is the subject matter of copending patent application of Sidney Bertram, Serial No. 199,797, filed June 4, 1962, entitled "Automatic Stereomapping System," and assigned to the assignee of this invention, a scanning mechanism is driven to traverse a predetermined path over the extent of a horizontal area while being controlled to move vertically following the contour of a projected stereoscopic image which corresponds to terrain being mapped. The scanning mechanism utilizes a mechanical scanner, known as a Nipkow scanning disk, and a pair of photomultiplier tubes to develop video signals which are utilized by associated equipment to produce an orthographic photograph of the terrain. In order that the detail of such a photograph may correspond as accurately as possible to the slope of the terrain being mapped, the Nipkow disk is arranged to tilt about an axis parallel to what is designated the Y axis in accordance with the slope of the terrain. The tilt of the Nipkow disk is controlled in response to error signals developed by specific circuitry which analyzes the video signals produced by the photomultiplier tubes.

It will be clear that practical considerations call for limiting the extent of tilt of the Nipkow disk about its tilt axis. One such consideration results from a mechanical constraint with the tilting of the Nipkow disk about the Y axis being limited to approximately 45° to prevent mechanical interference with the photomultiplier tubes, the scanner housing, and other associated equipment. A second limitation arises from the fact that as the Nipkow disk tilts about its tilt axis, a particular tilt angle is reached where light begins to be cut off from the photomultiplier tubes, thus rendering the system inoperative. The angle of tilt at which light is thus interrupted varies, depending upon the position of the scanner in its traverse of the projected image.

In order that the described scanning mechanism may be used to fullest advantage, some arrangement is desired for limiting the tilt of the Nipkow scanning disk in a manner which takes into account the permissible limit of tilt at any given point in the traverse. At the same time the tilt of the Nipkow scanning disk must be fully controllable to follow the slope of the terrain within the permissible limits. No previously known arrangement was adaptable for use in conjunction with the stereomapping system scanner to achieve the desired results.

It is therefore a general object of this invention to provide an arrangement for controlling the position of a mechanical element.

More particularly, it is an object of this invention to provide an arrangement for variably limiting the tilt of an element which is movable over a predetermined area.

It is a specific object of this invention to provide an arrangement for limiting the tilt of an element in accordance with its traverse position in an area being traversed.

It is a further object of the invention to provide a tilt limiting arrangement for a movable element which permits the tilt of the element to be readily controlled within the predetermined limits.

Briefly in accordance with the present invention, two sensing mechanisms are employed for providing signals respectively indicative of the existing angle of tilt ($\theta_y$) and the traverse (X) position of the movable element being controlled. In accordance with the invention, these signals are monitored so that circuitry for controlling the tilt of the element is disabled in the event that the tilt signal reaches a predetermined limit or that the resultant of the tilt and traverse position signals exceeds a predetermined level. At the same time, tilt error signals are monitored so that the tilt control circuit may be enabled again should a tilt error signal be developed such that the tilt of the element should be reduced below the established limit.

One particular arrangement in accordance with the invention utilizes potentiometers which are mechanically coupled to the scanner to provide the prescribed $\theta_y$ and X signals indicative of tilt angle and X coordinate position, respectively. These signals are combined algebraically in a summing circuit, and the resultant composite signal is applied to a first pair of threshold circuits which develop an output signal in the event that the composite signal is greater in absolute magnitude than some predetermined positive or negative limit. In addition, the tilt angle ($\theta_y$) signal is applied directly to a second pair of threshold circuits which provide an output signal in the event that the absolute magnitude of the tilt angle signal exceeds a predetermined limit. Output signals developed by the respective threshold circuits are applied through an OR circuit to a switch located in the feedback loop of the tilt control circuit utilized for controlling the tilt of the rotatable element. Tilt error signals, ordinarily applied through the switch to the tilt control circuitry, are also applied to a third pair of threshold circuits which produce output signals tending to override the particular first and second threshold circuits disabling the tilt control circuit when the sense of the tilt error signal is such as to reduce the angle of tilt below the particular limit. Thus full utilization of the permissible extent of tilt of the element is achieved within the particular limits which are determined as a function of the transverse position of the scanner.

A better understanding of the invention may be gained from a consideration of the following detailed description, taken in conjunction with the accompanying drawings, in which.

Figure 1:
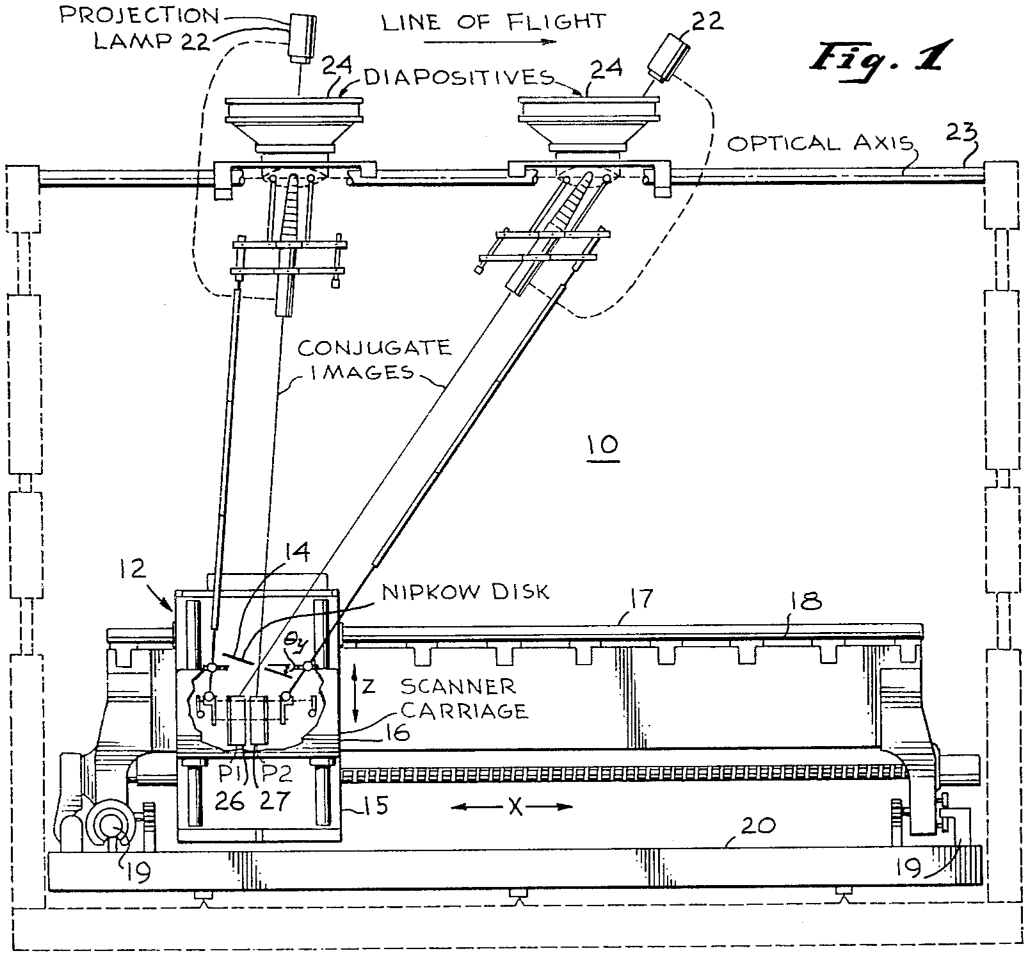
FIGURE 1 is an elevational view, partly broken away, of the mechanical portion of a stereomapping system in which the present invention may be employed to advantage.
Figures 2, 3:
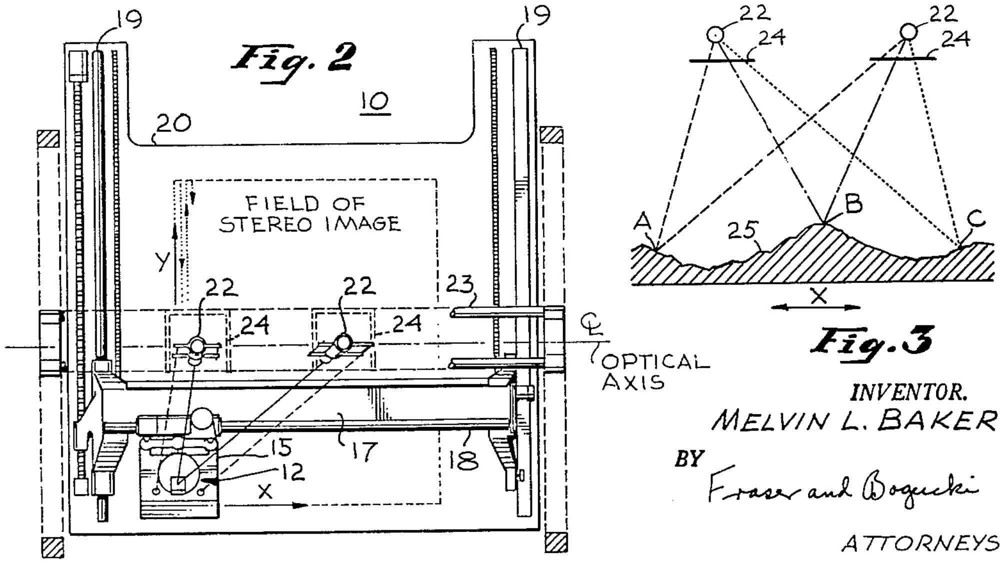
FIG. 2 is a plan view of the apparatus of FIG. 1.
FIG. 3 is a schematic diagram of the arrangement of FIG. 1 included to demonstrate the operation of the system.

In FIGS. 1 and 2 a plotter 10 is shown having X and Y coordinate direction indicated thereon. A scanner 12 carrying a Nipkow scanning disk 14 is shown positioned on a scanner carriage 16. The scanner carriage 16 is arranged to move vertically in the Z direction along an X axis carriage 15 which in turn is movable in the X direction along a guide rail 18. The guide rail 18 is part of a Y axis carriage 17 which is itself movable in the Y direction along guide rails 19 which are affixed to the base 20 of the plotter 10. A pair of light sources 22, shown mounted an upper frame member 23, are arranged to direct light through steroscopic diapositives 24 corresponding to aerial photographs of terrain to be mapped. The result is a projected stereoscopic image which may be said to have a contour corresponding to the actual terrain, in view of the fact that, as scanned by the scanner 12, registration of corresponding points in the respective images occurs at various elevations above the base 20 in accordance with the actual terrain. After passing through the scanning apertures of the Nipkow scanning disk 14, the light from the sources 22 impinges upon suitably positioned photomultiplier tubes 26 and 27 located below the Nipkow scanning disk 14. The photomultiplier tubes 26, 27 develop respective video signals corresponding to the light received at various positions of the projected stereoscopic image.

In operation, the scanner 12 is arranged to traverse a prescribed area of the projected image by movement of the carriage 16 back and forth in the Y direction along the Y axis guide rails 19 with step-over by a predetermined incremental distance in the X direction along the X axis guide rails 18 at each end of the Y traverse. While proceeding to scan the projected image in this fashion, the scanner 12 is moved vertically in response to control signals developed by associated hight control circuitry (not shown) from an analysis of the video signals generated by the photomultiplier tubes 26, 27. In addition, in order to develop more accurate tracking information, the Nipkow scanning disk 14 is arranged to be tiltable about a tilt axis parallel to the Y axis, and the degree of tilt about this axis is controlled so that the Nipkow disk may scan, insofar as is possible, in a plane parallel to the incremental area of the projected image at any given position. The tilt control signals are developed as A.-C. error signals corresponding in phase polarity and magnitude to the degree of deviation of the tilt angle from the slope of the image terrain. Thus, with respect to a reference A.-C. signal, an in-phase error signal produces a tilt in one direction while an out-of-phase signal produces tilt in the opposite direction.

In practice, extreme slopes of actual terrain are encountered which are greater than the Nipkow disk can be permitted to follow. One factor in limiting the maximum tilt angle of the Nipkow disk results from the cutting off of the light from one or the other of the light sources 22 as the angle of tilt becomes extreme in the direction toward the nearer edge of the stereo image field. This can be seen by referring to FIG. 3 which represents schematically a front elevation of the apparatus in FIGS 1 and 2. The light sources 22 are shown in their relationship to the diapositives 24 and the paths of the light beams are traced for various positions A, B, and C of the Nipkow scanning disk 14. The profile 25 represents a sectional contour of the projected stereoscopic image taken in the X coordinate direction, although it should be borne in mind that this is an image and not an actual section of a model. From FIG. 3, it is clear that tilting of the Nipkow disk to an extreme angle tends to cut off light from one or the other of the light sources 22 and furthermore that the angle of tilt at which such cutoff may occur is different for different X coordinate positions of the scanning disk 14.

While the scanning disk 14 is at the point A, for example, and receiving light along the paths indicated by the dashed lines, the disk 14 may be tilted by a large angle in the clockwise direction without interfering with the light beams from the light sources 22, but must be limited to a relatively small angle of tilt in the counterclockwise direction to avoid blocking light from the light from the right-hand light source 22. On the other hand, when the scanning disk 14 is at the point C, for example, and receiving light along the paths indicated by the dotted lines, the disk 14 may be tilted through a large angle in the counterclockwise direction but is limited to a relatively small angle of tilt in the clockwise direction to avoid blocking light from the left-hand light source 22. When the scanning disk 14 is at the point B, approximately midway between the light sources 22, and receiving light along the paths indicated by the dot-dashed lines, the permissible tilt is substantially the same in either direction. However, at this point another limiting factor comes into play, namely, a limit on the allowable degree of tilt which is imposed by the physical configuration of the scanner and the proximity of the scanning disk to adjacent components. Thus, in the vicinity of the midpoint of travel in the X direction, an absolute tilt limit is imposed which, in the particular embodiment described, is approximately 45°. In accordance with the present invention, a tilt limiting arrangement is provided to control the maximum degree of tilt in accordance with two different modes of constraint, one of which is an absolute limit related to the physical configuration of the apparatus and the other of which is variable depending upon the X coordinate position of the scanner.

Figure 4:
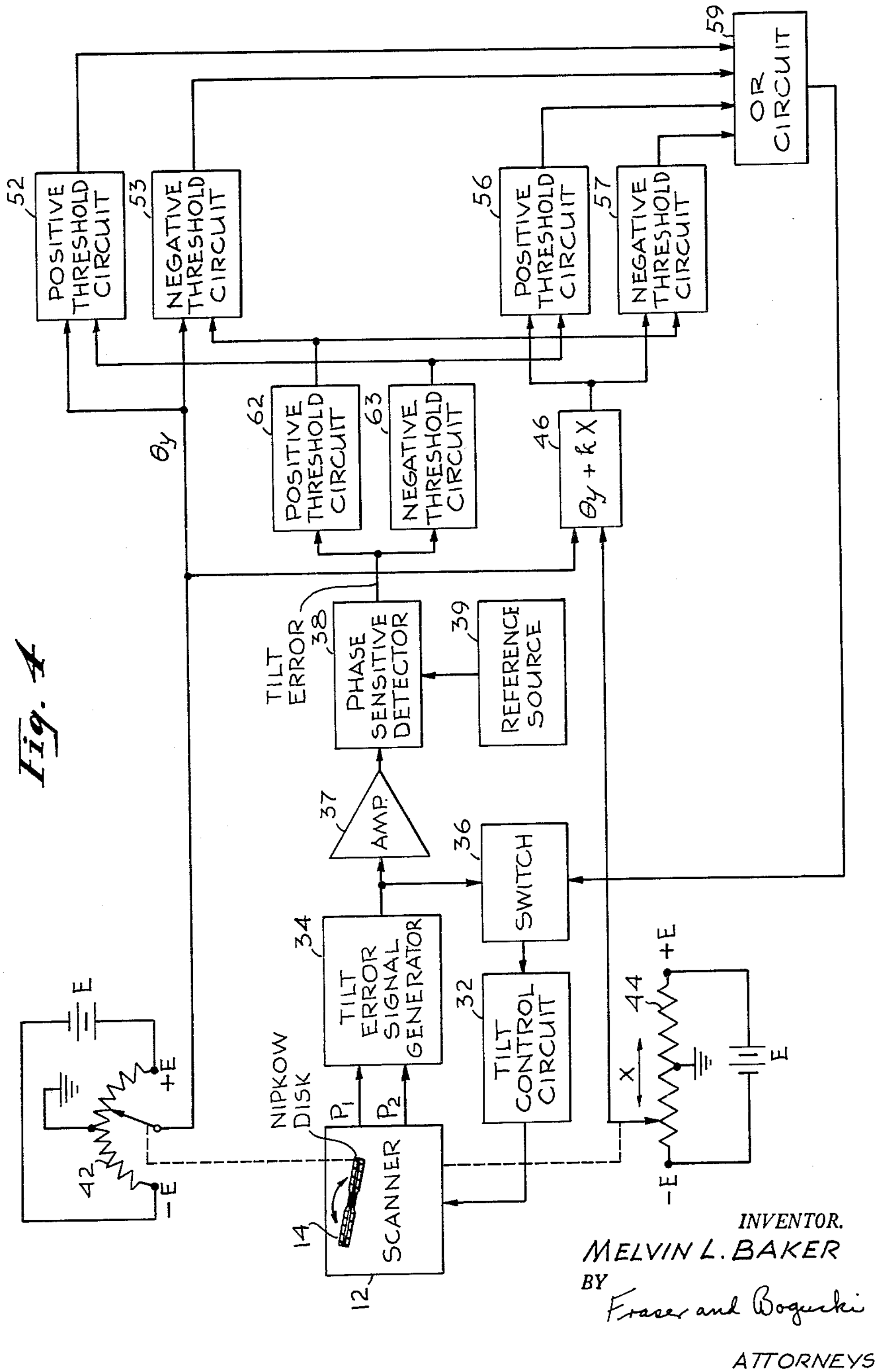
FIG. 4 is a block diagram of an arrangement in accordance with the invention for use in conjunction with the apparatus of FIG. 1.

A combination schematic and block diagram of one particular arrangement in accordance with the invention utilized in conjunction with a modified Kelsh plotter of the automatic stereomapping system of the above cited application is shown in FIG. 4. The diagram of FIG. 4 depicts a scanner 12 having a Nipkow disk 14 which is arranged to be tilted either clockwise or counterclockwise in response to a signal received from a tilt control circuit 32. The scanner 12 provides signals along separate paths from the individual photomultiplier tubes $P_1$ and $P_2$ to a tilt error signal generator 34. As already explained, the tilt error signal generator 34 produces tilt error signals in the form of an A.-C. wave of a phase polarity and magnitude corresponding to the deviation between the tilt angle of the Nipkow disk 14 and the slope of the image terrain. The tilt error signals are applied through a switch 36 to a feedback loop including the tilt control circuit 32. The tilt error signals are also directed via an amplifier 37 to a phase sensitive detector 38. The phase sensitive detector 38 also receives signals from a reference source 39 for comparison with the amplified tilt error signals received from the amplifier 37. The phase sensitive detector 38 is arranged to produce at its output a D.-C. tilt error signal which varies in magnitude with the A.-C. tilt error signal produced by the tilt error signal generator 34 and which is positive or negative depending on whether the A.-C. tilt error signal is in phase or out of phase with the signal provided by the reference source 39.

A pair of potentiometers 42 and 44 are mechanically coupled to the Nipkow disk 14 and the scanner 12, respectively, so as to provide analog electrical signals in accordance with the positions of the Nipkow disk 14 and the scanner 12. As shown, the potentiometer 42 is coupled to a reference potential and a D.-C. source E so as to produce a positive output voltage when a positive (i.e., clockwise) tilt exists and a negative voltage when a negative tilt is present. The potentiometer 42 is connected to produce zero output voltage for zero tilt of the Nipkow disk 14. The potentiometer 44 is similarly connected to a reference potential and a source of D.-C. voltage E so as to develop a positive output voltage for an X position on one side of a center point and a negative voltage for an X position on the other side of the center point. The potentiometer 44 is connected such that a zero output voltage is produced when the scanner carriage is midway between the two diapositives 24 (FIG. 1).

The voltage developed at the wiper of the potentiometer 42 is applied as a $\theta_y$ signal to one input terminal of each of a first pair of threshold circuits, a positive threshold circuit 52 and a negative threshold circuit 53. The $\theta_y$ signal from the potentiometer 42 is also applied as one input to a summing network 46. The voltage from the wiper of the potentiometer 44, indicative of X position of the scanner 12, is applied as a second input to the summing network 46, where it is combined with the $\theta_y$ signal with an appropriate factor of proportionality. The output of the summing network 46, which is thus a composite signal $\theta_y+kX$, is applied to one input terminal of each of a second pair of threshold circuits, designated a positive threshold circuit 56 and a negative threshold circuit 56 and a negative threshold circuit 57. Output leads of the threshold 52, 53, 56, and 57 are applied to an OR circuit 59, from which a signal path is provided to the switch 36 to control the application of tilt error signals to the tilt control circuit 32.

The second input terminals of the first and second pair of threshold circuits 52, 53, and 56, 57 are connected to receive signals from a third pair of threshold circuits, a positive threshold circuit 62 and a negative threshold circuit 63. The positive threshold circuit 62 is connected to the negative threshold circuits 53 and 57, while the negative threshold circuit 63 is connected to the positive threshold circuits 52 and 56. The threshold circuits 62 and 63 in turn are connected to receive the D.-C. tilt error signals generated by the phase sensitive detector 38.

In the operation of the arrangement of the invention represented in FIG. 4, the tilt correcting servo loop is disabled by opening the loop at the input to the tilt control circuit 32 by means of the switch 36 whenever a particular tilt limit is reached. The switch 36, when actuated, grounds the lead to the input of the tilt control circuit 32 so that the drive system maintains the tilt of the Nipkow disk 14 at the particular angle existing when the switch was actuated. Thus, whenever the switch 36 is actuated by signals from the OR circuit 59, the Nipkow disk 14 is maintained at a constant angle of tilt. This situation occurs whenever the tilt angle signal $\theta_y$ generated at the potentiometer 42 exceeds some predetermined absolute value or whenever the composite signal developed at the potentiometers 42 and 44 exceeds a second predetermined absolute value unless the polarity of the tilt error signal is such as to reduce the tilt angle. This is accomplished in accordance with an aspect of the invention by means of the positive and negative threshold circuits 52 and 53 which are responsive, respectively, to positive and negative $\theta_y$ signals greater than a predetermined threshold value, which value is selected in accordance with the limit of tilt angle established by the mechanical configuration of the mechanism and, in the case described, is approximately 45°. The variable tilt angle at which the eclipsing of the light beams may occur is handled completely independently by combining the tilt angle signal $\theta_y$ from the potentiometer 42 with the X position signal from the potentiometer 44 in the summing network 46. When the analog sum of these voltages exceeds a predetermined value related to the maximum permissible angle of tilt at the points of extreme travel of the scanner carriage in the X direction, one or the other of the second pair of threshold circuits 56, 57 is energized to produce an actuating signal for application to the switch 36. It will be understood that the larger the value of X, the smaller the positive tilt which can be tolerated before light from one of the light sources 22 is cut off; conversely, when the scanner carriage is near the point midway between the diapositives 24, a larger angle of tilt is permissible before the light beams are cut off. Thus, by virtue of the arrangement just described, the tilt feature developed for the cited automatic stereomapping system may be employed to maximum advantage by relating the maximum premissible degree of tilt to a variable limit according to the position of the scanner and a fixed limit imposed as a mechanical restraint, whichever is less.

In addition, in accordance with the further aspects of the invention, the switch 36 is de-energized so that tilt control by the tilt control circuit 32 may be restored whenever the polarity and magnitude of the tilt error signals are such as to reduce the angle of tilt of the Nipkow disk 14 below an established threshold. Thus, for example, if the tilt of the Nipkow disk 14 is fixed at a particular positive angle from having exceeded the threshold limit established by either the first positive threshold circuit 52 or the second positive threshold circuit 56, the occurrence of an out-of-phase signal from the tilt error signal generator 34 tending to drive the Nipkow disk 14 counterclockwise produces a negative D.-C. tilt error signal after amplification and detection by the amplifier 37 and phase sensitive detector 38, respectively. When this D.-C. tilt error signal, applied to the negative threshold circuit 63, exceeds a predetermined value, the negative threshold circuit 63 produces an output signal which is applied to the positive threshold circuits 52 and 56 to override the other input signals applied thereto. Thus, the actuating signal is removed from the switch 36 so that the feedback servo loop may be reestablished and the tilt control circuit 32 may again be operated in accordance with the signals developed by the tilt error signal generator 34. Should the opposite situation be present, that is, the Nipkow disk 14 being limited at a negative tilt angle with an in-phase signal developed by the tilt error signal generator 34, a positive tilt error signal is operative to overcome the threshold of the positive threshold circuit 62, in turn overriding the input signals of the negative threshold circuits 53 and 57 so that the switch 36 is again de-energized and the tilt control circuit 32 again made responsive to signals from the tilt error signal generator 34.

The various circuits utilized in the particular arrangement in accordance with the invention described hereinabove and represented as blocks in the circuit diagram of FIG. 4 correspond to control circuit, amplifier, detector, and thereshold circuits known in the art and need not be described in further detail herein. It should be noted that other arrangements may be employed within the scope of the present invention; for example, the potentiometers 42 and 44 may be excited with A.-C. instead of D.-C. voltages or may be replaced with resolvers or transducers to provide the same result. Although there has been described above a specific arrangement of a tilting limiting mechanism in accordance with the invention for the purpose of illustrating the manner in which the invention may be used to advantage, it will be appreciated that the invention is not limited thereto. Accordingly, any and all modifications, variations, or equivalent arrangements falling within the scope of the annexed claims should be considered to be a part of the invention.

I claim:

1. Apparatus for limiting the tilt of a movable element which is movable in a horizontal plane and tiltable about a particular horizontal axis comprising:

tilt control means for controlling the tilt of the element in accordance with signals supplied thereto, a first sensor coupled to the element for producing a signal indicating the tilt position thereof, a second sensor coupled to the element for producing a signal indicating the transverse position thereof in the horizontal plane, threshold means coupled to said sensors for receiving signals indicating the tilt and transverse positions of the element, and means responsive to said threshold means for disabling the tilt control means upon the occurrence of signals from the sensors in excess of predetermined threshold levels.

2. Apparatus for limiting the tilt of a scanning disk in accordance with the position of a scanner in a horizontal plane comprising:

tilt control means for controlling the tilt to the scanning disk in response to tilt error signals supplied thereto, first and second sensing means coupled to the scanner for providing signals indicative of scanning disk tilt and transverse position of the scanner in said horizontal plane respectively, means for combining the signals from the first and second sensing means to provide a composite signal, a plurality of threshold circuits coupled respectively to receive the tilt indicating signal and the composite signal, and means for disabling the tilt control means in the event that either the tilt indicating signal exceeds a first predetermined absolute valve or that the composite signal exceeds a second predetermined absolute value.

3. A tilt limiting mechanism for use in conjunction with a mechanical scanning disk of a stereomapping system, the disk being driven by driving means within the system with a scanner to traverse a particular horizontal plane and arranged to tilt about a fixed horizontal axis passing through the mechanical scanning disk comprising:
tilt control means for controlling the angle of tilt of the mechanical scanning disk,
a tilt error signal generator coupled to receive signals from the scanner and to develop a tilt error signal for application to the tilt control means,
a first sensor coupled to the scanning disk for providing a tilt signal,
a second sensor coupled to the scanner for providing a position signal indicative of the position of said scanner in said horizontal plane,
an adding circuit coupled to the first and second sensors for combining the tilt and position signals and for providing a resulting composite signal,
first threshold means coupled to receive the composite signal and to provide a disabling signal to tilt con- control means in the event that the composite signal exceeds a first predetermined level and
means including second threshold means responsive to the tilt error signal for overriding the first threshold means in the event of a tilt error signal having a polarity opposite to the polarity of said composite signal and a level which, when combined with said composite signal, inhibits said first threshold means from providing said disabling signal.

4. A tilt limiting mechanism in accordance with claim 3 further including means connected to the tilt error signal generator for detecting the phase of the tilt error signals with respect to a reference signal and for providing a D.-C. tilt error signal corresponding in polarity to the phase of the detected tilt error signals for application to the third threshold means.

5. A tilt limiting mechanism comprising:
an element movable in a horizontal plane and tiltable about an axis parallel to said plane and which is to be limited in its permissible angle of tilt,
a tilt control circuit for controlling the tilt of said element in response to tilt error signals supplied thereto,
first means coupled on the element for providing a voltage indicative of the angle of tilt thereof,
second means coupled to the element for providing a voltage indicative of the position of said element in said horizontal plane,
means responsive to both of said voltages for providing a composite voltage,
threshold means responsive to said voltage indicative of the angle of tilt of said element and said composite voltage for disabling the tilt control circuit in the event either of said voltages exceeds a predetermined level, and
means responsive to said tilt error signals, for developing an input signal supplied to said threshold means so that upon the occurrence of an error signal of a particular magnitude and polarity, said threshold means are inhibited from disabling said tilt control circuit, thereby enabling said tilt control circuit to reduce the angle of tilt of said element.

6. A tilt limiting mechanism for use with an automatic mapping system comprising:
means including a scaner having a mechanical scanning disk and a pair of photomultiplier tubes scanning incremental areas to be mapped for providing independent signals related to the areas being scanned,
a tilt error signal generator responsive to said signals for producing tilt error signals in accordance with the deviation of the tilt of the mechanical scanning disk from the slope of the incremental areas being scanned,
means for controlling the tilt of said tilt disk in response to said error signals,
a first sensor coupled to said disk for providing a first signal in accordance with the tilt angle of said disk,
a second sensor coupled to said scanner for providing a second signal in accordance with the position of the scaner in a particular direction with respect to the areas being mapped,
first positive and negative threshold circuits coupled to receive a tilt angle voltage from the first sensor,
second positive and negative threshold circuits coupled to receive a composite voltage corresponding to the sum of the voltages from the first and second sensors,
means coupled to the outputs of said threshold circuits for interrupting the path of said tilt error signals to the tilt control means upon the development of an output voltage by any one of said threshold circuits, and
means responsive to said tilt error signals for producing voltages which upon the occurrence of tilt error signals of particular polarity and magnitude with respect to the tilt and position of said disk have magnitudes which are sufficient to override either or both of said tilt angle voltage and composite voltage so as to inhibit said threshold circuits from interrupting the path of said tilt error signals to said tilt control means, thereby enabling said tilt control means to reduce the tilt of said scanning disk.

7. In combination, a scanner movable in at least two orthogonal directions,
a scanning element attached to the scanner and tiltable about an axis of tilt parallel to one of said orthogonal directions,
first means for indicating the degree of tilt of said element,
second means for indicating the position of said scanner in the other of said orthogonal directions,
tilt control means for controlling the angle of tilt of said element, and
means for disabling said tilt control means in the event that the angle of tilt exceeds a limit which is a function of the position of said scanner in said other orthogonal direction.

8. A combination as set forth in claim 7 further including means for disabling the tilt control means in the event that the angle of tilt reaches a predetermined fixed limit.

9. A combination as set forth in claim 8 further including means for overriding the disabling means upon the occurrence of signals such as to cause the tilt control means to reduce the angle of tilt.

10. in combination, a scanner movable in at least two orthogonal directions,
a scanning element attached to the scanner and tiltable about an axis of tilt parallel to one of said orthogonal directions,
first means for producing a first signal indicative of the degree of tilt of said element,
second means for a second signal indicative of the position of said scanner in the other of said orthogonal directions,
means for controlling the tilt of said element, and
means for disabling said tilt control means in the event that the angle of tilt exceeds a limit which is a function of the existing angle of tilt and the position of the scanner in said other orthogonal direction as indicated by said first and second signals.

11. A tilt limiting mechanism for use in conjunction with a mechanical scanning disk of a stereomapping system, the disk being driven with a scanner and signal producing means contained therein to traverse a horizontal plane and arranged to tilt about a fixed horizontal axis comprising:

tilt control means for controlling the angle of tilt of the mechanical scanning disk, a tilt error signal generator coupled to receive signals from said signal producing means contained in the scanner and to develop a corresponding tilt error signal for application to the tilt controlling means, a first sensor coupled to the scanning disk for providing a tilt signal, a second sensor coupled to the scanner for providing a position signal, an adding circuit coupled to the first and second sensors for combining the tilt and position signals and for providing a resulting composite signal, first and second threshold circuits coupled to receive the composite signal and the tilt signal and to provide a disabling signal to the tilt control means in the event that the tilt of the scanning disk exceeds either a fixed limiting value or a predetermined level which is a function of scanner position, whichever is less, and third threshold means responsive to the tilt error signal for overriding the first and second threshold means in the event of a tilt error signal having an opposite polarity with respect to the sensor signals.

12. Apparatus for limiting the tilt of an element responsive to tilt signals and which is movable in a horizontal plane and tiltable about an axis parallel to said plane comprising:

first means for tilting the element about the axis in accordance with the tilt signals supplied thereto;

a first sensor coupled to the element for producing a first signal indicative of the degree of tilt of the element about the axis;

a second sensor coupled to the element for producing a second signal indicative of the position of the element in the horizontal plane; and second means including summing means coupled to said first and second sensors and responsive to said first and second signals for disabling said first means when said first signal exceeds a first predetermined level or when said first and second signals summed in said summing means exceed a second predetermined level.

13. A tilt limiting mechanism for use in conjunction with a mechanical scanning disk of a stereomapping system, the disk being a part of a scanner driven by driving means of the system to traverse a horizontal plane and arranged to tilt about a first horizontal axis comprising:

tilt controlling means for controlling the angle of tilt of the mechanical scanning disk;

a tilt error signal generator coupled to receive signals from the scanner and to develop a tilt error signal for application to the tilt controlling means;

a sensor coupled to the disk for producing a tilt signal indicative of the tilt of the disk about said first horizontal axis;

first threshold means coupled to receive said tilt signal to provide a disabling signal to said tilt controlling means whenever said tilt signal exceeds a predetermined level;

and means including a second threshold means responsive to said tilt error signal for overriding said first threshold means upon the occurrence of a tilt error signal having a polarity opposite to said tilt signal, and having a level which when combined with said tilt signal inhibits said first threshold means from providing said disabling signal.

References Cited by the Examiner

UNITED STATES PATENTS

| | | | |
|---|---|---|---|
| 2,283,226 | 5/1942 | Porter | 88—24 |
| 2,910,910 | 11/1959 | Rosenfeld et al. | 88—24 |
| 2,988,953 | 6/1961 | Barnett | 88—24 |
| 3,004,464 | 10/1961 | Leighton et al. | 88—24 |

NORTON ANSHER, *Primary Examiner.*

WILLIAM MISIEK, *Examiner.*